United States Patent
Li

(12) 
(10) Patent No.: US 6,681,991 B1
(45) Date of Patent: Jan. 27, 2004

(54) CARD READING DEVICE HAVING A MULTI-FUNCTIONAL CONNECTOR

(75) Inventor: Ming Li, Taipei (TW)

(73) Assignee: e Fly Solutions Company, Taipei (TW)

( * ) Notice: Subject to any disclaimer, the term of this patent is extended or adjusted under 35 U.S.C. 154(b) by 0 days.

(21) Appl. No.: 10/201,900

(22) Filed: Jul. 25, 2002

(51) Int. Cl.[7] .................................................. G06K 7/00
(52) U.S. Cl. ...................................... 235/439; 235/441
(58) Field of Search ................................ 235/439, 440, 235/441, 459; 902/4

(56) References Cited

U.S. PATENT DOCUMENTS

| | | | | | |
|---|---|---|---|---|---|
| 5,691,525 A | * | 11/1997 | Aoki et al. | .................. | 235/379 |
| 6,145,046 A | * | 11/2000 | Jones | .......................... | 710/129 |
| 6,230,970 B1 | * | 5/2001 | Walsh et al. | ................ | 235/379 |
| 6,282,407 B1 | * | 8/2001 | Vega et al. | ................... | 455/41 |
| 6,327,575 B1 | * | 12/2001 | Katz | .......................... | 235/7 R |
| 6,438,638 B1 | * | 8/2002 | Jones et al. | ................. | 710/301 |

FOREIGN PATENT DOCUMENTS

EP          1168137         *  2/2002        ........... G11B/20/00

* cited by examiner

*Primary Examiner*—Daniel St. Cyr
(74) *Attorney, Agent, or Firm*—Bacon & Thomas, PLLC

(57) ABSTRACT

A card reading device includes a multi-functional connector capable of connecting to one of a variety of portable electronic devices and a control circuit of the card reading device respectively, wherein the control circuit has a detection circuit. Once a portable electronic device is connected to the cad reading device, the detection circuit is automatically activated to detect an identification (ID) of the electronic device. In response, one of second drivers is activated to drive the electronic device for electrically connecting the electronic device and reading data from the memory cards connected thereto.

5 Claims, 2 Drawing Sheets

US 6,681,991 B1

CARD READING DEVICE HAVING A MULTI-FUNCTIONAL CONNECTOR

FIELD OF THE INVENTION

The present invention relates to a card reading device and more particularly to an improved card reading device having a multi-functional connector with a number of advantageous characteristics.

BACKGROUND OF THE INVENTION

Recently, electronic and information technologies have known a rapid, spectacular development leading to a continuous performance improvement of computers and computer peripherals. Further, a variety of low price yet advanced software products are commercially available. This in turn further increases applications of such computers and computer peripherals among our daily life, learning, and work. As a result, the growth of computer products in the consumer market is very fast. For coping with this trend, many manufacturers of computers and computer peripherals have endeavored to develop new products to meet the needs of the vast developing market.

It is understood that a portable electronic device (e.g., personal digital assistant (PDA)) must have an acceptable degree of fall-proof since a frequent carrying is inevitable. In this regard, a storage device of such portable electronic device is implemented as an electronic-based static memory card rather than a hard disk having a mechanical support. A variety of memory cards such as CF card, SD card, and SM card are commercially available. Hence, a card reading device capable of connecting to one or more of such memory cards for simultaneously reading data therefrom is developed. Once a computer is connected to the card reading device which is already connected to a plurality of memory cards, the computer is capable of reading data from the memory cards simultaneously. However, applications of the well known card reading device are limited since it is only allowed to couple to the computer. For reading data from the memory cards, any of other electronic devices is required to couple to the computer which is in turn connected to the memory cards. In view of the above, it is very inconvenient.

Thus, it is desirable among the manufacturers to provide a card reading device having a multi-functional connector capable of connecting to one of a variety of portable electronic devices for reading data therefrom in order to overcome the above drawback of the prior art.

SUMMARY OF THE INVENTION

The invention relates to a card reading device having a multi-functional connector for eliminating the above drawback of the prior art, i.e., the applications of the well known card reading device are limited since it is only allowed to couple to the computer.

A primary object of the present invention is to provide a card reading device having a multi-functional connector comprising a multi-functional connector on the card reading device, the multi-functional connector being capable of connecting to one of a variety of portable electronic devices and a control circuit of the card reading device respectively, the control circuit having a detection circuit. Once the user connects a portable electronic device to the card reading device, the detection circuit is automatically activated to detect an identification (ID) of the electronic device. In response, one of second drivers is activated to drive the electronic device for electrically connecting the electronic device and for reading data from the memory cards connected to the card reading device. By utilizing the multi-functional card reading device, one of the variety of portable electronic devices can be connected to the card reading device for reading data from the memory cards connected to the card reading device.

Another object of the present invention is to provide a universal serial bus (USB) connector on the card reading device. The card reading device further comprises a first driver connected to the corresponding USB connector and the control circuit respectively. Thus, a computer is capable of communicating with the card reading device by connecting to the USB connector and data read by the CPU is capable of being sent to the computer. As a result, the computer can read data from the memory cards connected to the card reading device.

The above and other objects, features and advantages of the present invention will become apparent from the following detailed description taken with the accompanying drawings.

DETAILED DESCRIPTION OF THE PREFERRED EMBODIMENTS

The invention is directed to a card reading device having a multi-functional connector for eliminating the above drawback of the prior art, i.e., the applications of the well known card reading device are limited since it is only allowed to couple to the computer.

Figure 1:
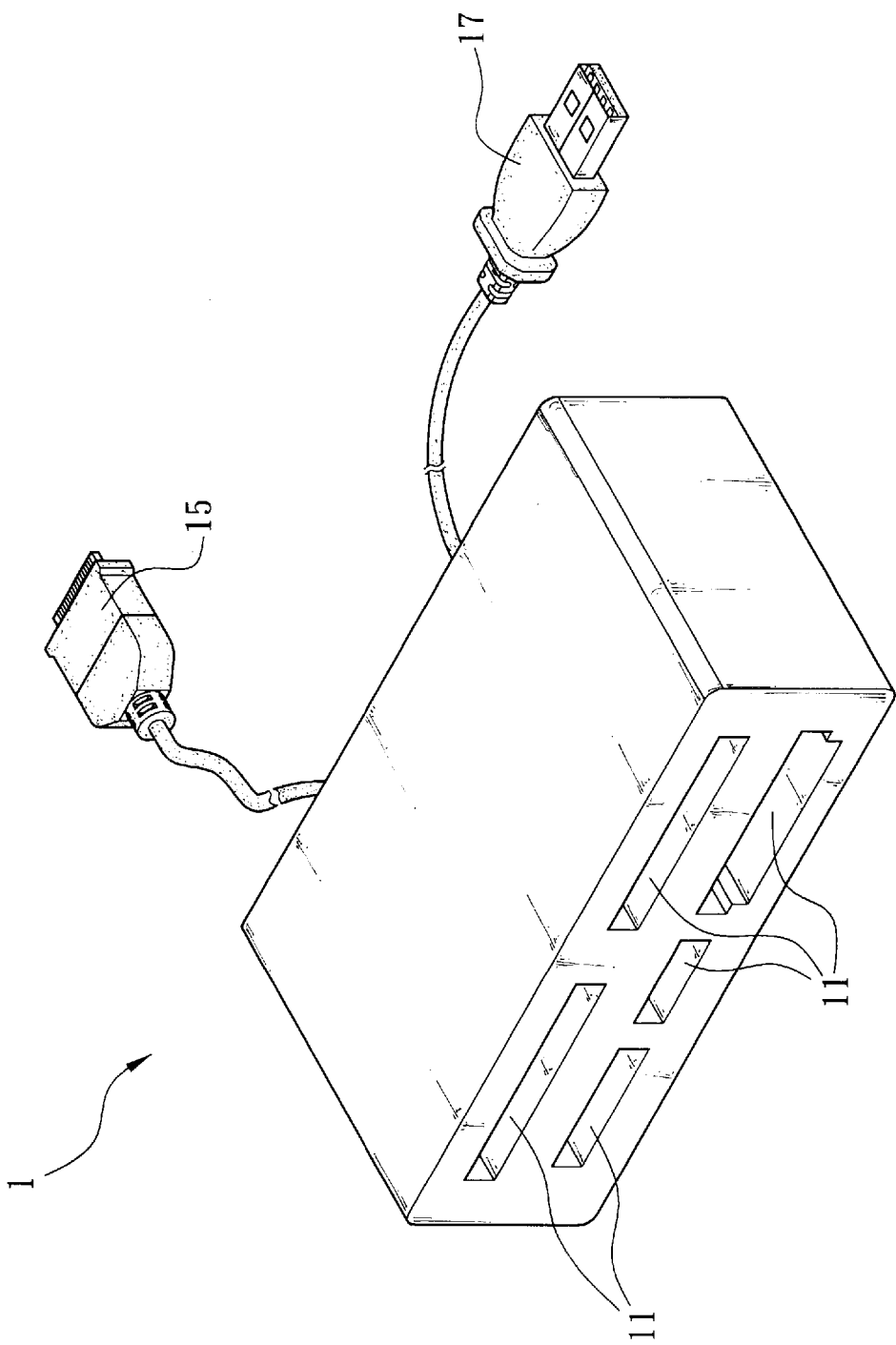
FIG. 1 is a perspective view of a preferred embodiment of a card reading device according to the invention.
Figure 2:
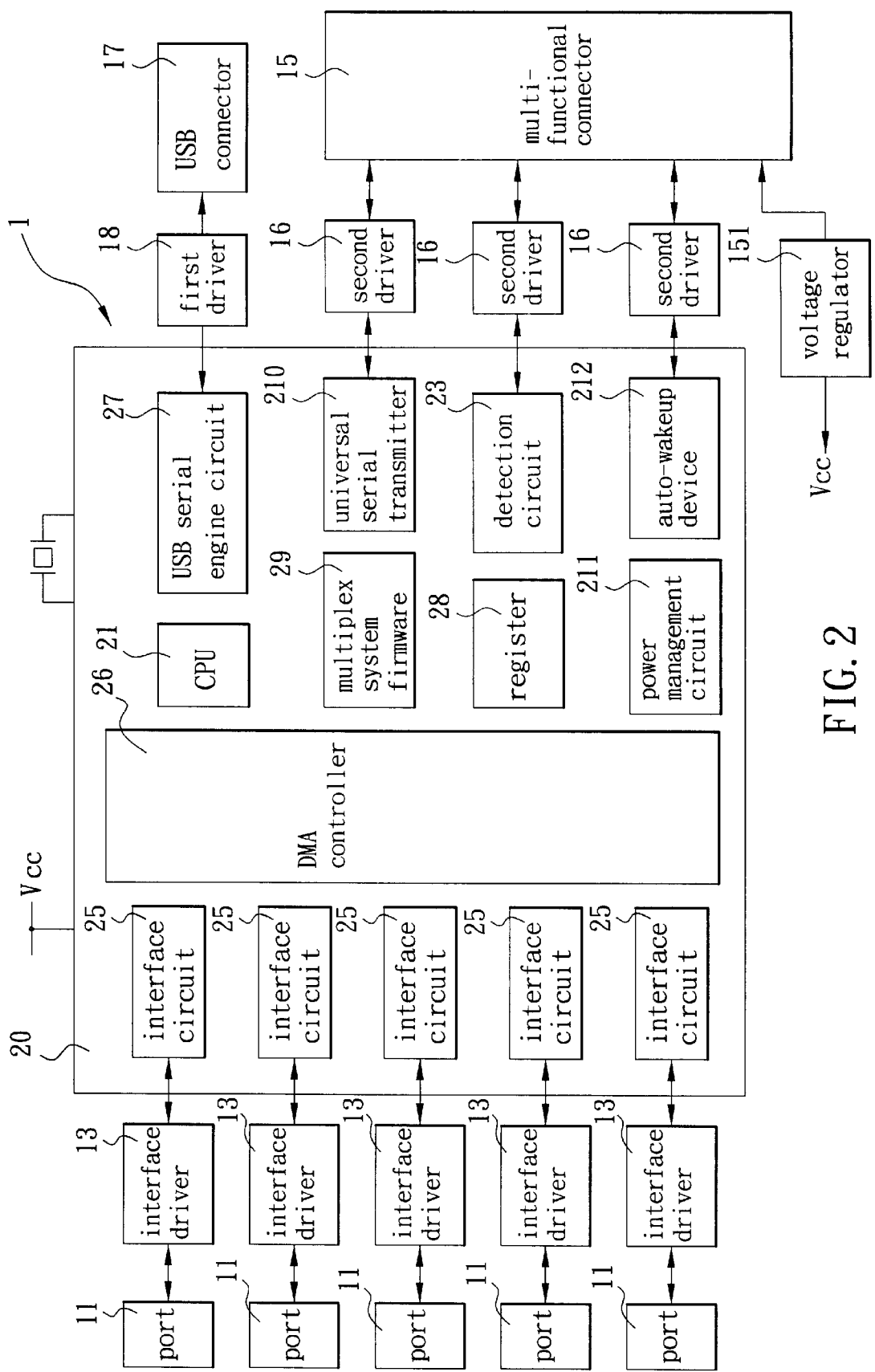
FIG. 2 is a block diagram of components of the card reading device shown in FIG. 1.

Referring to FIGS. 1 and 2, there is shown a card reading device 1 in accordance with the invention comprising a plurality of ports 11 for connecting to a variety of memory cards (e.g., SD card, MS card, CF card, SM card, SC card, MMC card, MD card, etc.), a plurality of interface drivers 13, equal in number to the ports 11 and each corresponding to and connected to a respective port 11, and an internal control circuit 20 connected to the interface drivers 13 so that a central processing unit (CPU) 21 of the control circuit 20 is capable of reading data from the memory cards connected to the ports 11.

Referring to FIGS. 1 and 2 again, the card reading device 1 further comprises an extended universal serial bus (USB) connector 17 and a first driver 18 connected to the corresponding USB connector 17 and the control circuit 20 respectively. In a case that a computer is communicated with the card reading device 1 by connecting to the USB connector 17, data read by the CPU 21 can be sent to the computer. As an end, the computer is capable of reading data from the memory card connected to the card reading device 1. The card reading device 1 further comprises an extended multi-functional connector 15 capable of connecting to one of a variety of portable electronic devices (e.g., PDA, cellular phone, etc.) and a plurality of second drivers 16 in cooperation with the electronic devices and connected to the multi-functional connector 15 for communicating with the electronic device. The control circuit 20 further comprises a detection circuit 23.

By assembling the above components, once the user connects a portable electronic device to the multi-functional connector 15 of the card reading device 1, the detection circuit 23 is automatically activated to detect an identification (ID) of the electronic device. In response, one of second drivers 16 is activated to drive the electronic device for electrically connecting the electronic device to the card reading device 1. Next, data read by the CPU 21 is sent to the electronic device. As an end, the electronic device is capable of reading data from the memory cards connected to the card reading device 1.

Referring to FIG. 2 specifically, the control circuit 20 of the invention further comprises a plurality of interface circuits 25 and a direct memory access (DMA) controller 26. Each of the interface circuits 25 has an associated timing controller. The interface circuits 25, equal in number to the interface drivers 13, are connected to the interface drivers 13 respectively. Hence, the CPU 21 may sequentially read data from the memory card connected to the interface drivers 13. The read data is in turn sent to the coupled electronic device. Alternatively, the CPU 21 may read data sent from the electronic device and store the same in the associated memory card.

Referring to FIG. 2 specifically, the control circuit 20 of the invention further comprises a USB serial engine circuit 27 connected to the first driver 18. Hence, in a case that the computer is connected to the USB connector 17 the computer may control the CPU 21 of the control circuit 20 via the USB serial engine circuit 27 for accessing data.

Referring to FIG. 2 specifically, the control circuit 20 of the invention further comprises a multiplex system firmware 29 and a universal serial transmitter 210. Hence, in a case that the electronic device is connected to the card reading device 1 the CPU 21 of the control circuit 20 may access data in response to instructions sent from the electronic device.

Referring to FIG. 2 specifically, the control circuit 20 of the invention further comprises a register 28 for temporarily storing data to be processed by the CPU 21. The provision of the register 28 may facilitate a time division multiplexing based data processing.

Referring to FIG. 2 specifically, the control circuit 20 of the invention further comprises a power management circuit 211 and an auto-wakeup device 212. After a period of inactivity of the control circuit 20, the power management circuit 211 as commanded by the CPU 21 may put the control circuit 20 in an off-butready power saving state. Also, when the control circuit 20 receives data, the auto-wakeup device 212 may activate the control circuit 20 immediately for causing the control circuit 20 to return to an active state.

Referring to FIG. 2 specifically, the multi-functional connector 15 of the invention comprises a voltage regulator 151 which is electrically connected to a power source (Vcc). In operation, power is first regulated in the voltage regulator 151 prior to supplying to the multi-functional connector 15. Hence, in a case that the electronic device is connected to the multi-functional connector 15, the regulated power may be supplied to the electronic device for a normal operation or for charging the rechargeable battery mounted in the electronic device.

Thus, by utilizing the invention, not only a computer connected to the card reading device 1 may read data from the memory card but also one of a variety of portable electronic devices connected to the multi-functional connector 15 of the card reading device 1 may read data from the memory card. In brief, the invention is a convenient, powerful and multi-functional card reading device.

While the invention has been described by means of specific embodiments, numerous modifications and variations could be made thereto by those skilled in the art without departing from the scope and spirit of the invention set forth in the claims.

What is claimed is:

1. A card reading device having a multi-functional connector comprising:
   a plurality of ports on the card reading device for connecting to a variety of memory cards, the card reading device further comprising a plurality of interface drivers, equal in number to the ports and each corresponding to and connected to a respective port, and an internal control circuit connected to the interface drivers so that a central processing unit (CPU) of the control circuit is capable of reading data from the memory cards connected to the ports;
   a universal serial bus (USB) connector on the card reading device, the card reading device further comprising a first driver connected to the corresponding USB connector and the control circuit respectively so that a computer is capable of communicating with the card reading device by connecting to the USB connector and data read by the CPU is capable of being sent to the computer;
   a multi-functional connector on the card reading device, the multi-functional connector being capable of connecting to one of a variety of portable electronic devices, the card reading device further comprising a plurality of second drivers in cooperation with the electronic devices and connected to the multi-functional connector for communicating with the one of said variety of portable electronic devices that is connected to said multi-functional connector; and
   a detection circuit in the control circuit;
   wherein in response to a connection of said one of the portable electronic devices to the multi-functional connector, the detection circuit is automatically activated to detect an identification (ID) of the one electronic device, one of the second drivers is next activated to drive the one electronic device for electrically connecting the one electronic device to the card reading device, and data read by the CPU is sent to the one electronic device, and
   whereby each of said variety of electronic devices to which the multi-function connector may be connected is therefore capable of reading data from each of the variety of memory cards connected to the card reading device.

2. The card reading device of claim 1, wherein the control circuit further comprises a power management circuit and an auto-wakeup device so that after a period of inactivity of the control circuit, the power management circuit as commanded by the CPU is operative to put the control circuit in an off-but-ready power saving state and when the control circuit receives data, the auto-wakeup device is operative to activate the control circuit immediately for causing the control circuit to return to an active state.

3. The card reading device of claim 1, wherein the multi-functional connector comprises a voltage regulator which is electrically connected to a power source so that in an operation, power is first regulated in the voltage regulator prior to supplying to the multi-functional connector and the electronic device sequentially.

4. The card reading device of claim 1, wherein one of the portable electronic devices is a personal digital assistant (PDA).

5. The card reading device of claim 1, wherein one of the portable electronic devices is a cellular phone.

* * * * *